United States Patent [19]

Johnsen

[11] Patent Number: 4,500,235

[45] Date of Patent: Feb. 19, 1985

[54] COUPLING

[76] Inventor: Anders E. Johnsen, Karlsgårdsgatan 7B, S-781 33 Borlänge, Sweden

[21] Appl. No.: 380,666

[22] PCT Filed: Sep. 4, 1981

[86] PCT No.: PCT/SE81/00249

§ 371 Date: May 4, 1982

§ 102(e) Date: May 4, 1982

[87] PCT Pub. No.: WO82/00863

PCT Pub. Date: Mar. 18, 1982

[30] Foreign Application Priority Data

Sep. 5, 1980 [SE] Sweden .................. 8006209

[51] Int. Cl.$^3$ ............................................ B23B 39/00
[52] U.S. Cl. .................................... 408/238; 408/234; 403/379; 403/408; 269/43; 269/48.1
[58] Field of Search ............... 279/2; 408/238, 62, 408/65, 66, 69, 129, 135, 239, 234, 241 R; 403/378, 379, 408, DIG. 8, 377; 269/43, 48.1; 82/44; 242/72.1

[56] References Cited

U.S. PATENT DOCUMENTS 3,301,108 1/1967 Heiner ..................... 279/2
3,387,865 6/1968 Ross ........................ 279/2
3,576,336 4/1971 Uhlig ....................... 279/2

FOREIGN PATENT DOCUMENTS 157300 12/1956 Sweden .
627922 7/1978 U.S.S.R. ................. 279/2
709272 1/1980 U.S.S.R. .

Primary Examiner—Z. R. Bilinsky
Assistant Examiner—Daniel W. Howell
Attorney, Agent, or Firm—Charles E. Brown

[57] ABSTRACT

This invention relates to a coupling comprising female and male members (19, 18) having co-operating wedge surfaces (20,21), which may be urged into contact by tightening means (37). A spring (29) is adapted, upon tightening of the coupling, to accumulate spring force urging the wedge surfaces of the members against each other. The coupling is suitable for interconnection of two or more elements (13, 14) in order to form a longitudinal guide for a boring machine.

6 Claims, 4 Drawing Figures

COUPLING

TECHNICAL FIELD

The invention is related to a coupling comprising a female and a male member having co-operating wedge surfaces, which are movable into and out of contact with each other by generally axial relative movement of the members, said coupling comprising means to urge the wedge surfaces into intimate contact with each other upon tightening of the coupling.

Such a coupling is advantageous for erecting guides for boring machines.

BACKGROUND OF THE INVENTION

Such a coupling is disclosed in the Swedish patent No. 157 300 and comprises a pre-tensioned spring, which only has the purpose to maintain the connection should the tightening means formed by an eccentric be undeliberately released. When the locking by the eccentric is correct, the spring has no function. The tension of the spring is reduced on tightening of the coupling.

SUMMARY OF THE INVENTION

The object of the invention is to improve this coupling so that the spring always will have a certain influence on the maintaining of the tightened state of the coupling. This object is obtained in that the spring is adapted, upon tightening of the coupling, to accumulate spring force urging the wedge surfaces of the members towards each other. Thus, the tensioning means and the spring will act in "series" so that the tightening will give rise to the spring force. According to the Swedish patent, the tightening means and the spring function in parallel.

Other preferable features of the invention are defined in the appendant claims.

BRIEF DESCRIPTION OF THE DRAWINGS

With reference to the appended drawings, a specific disclosure of a preferred embodiment will follow hereinafter.

In the drawings.

BEST MODE OF CARRYING OUT THE INVENTION

Figure 1:
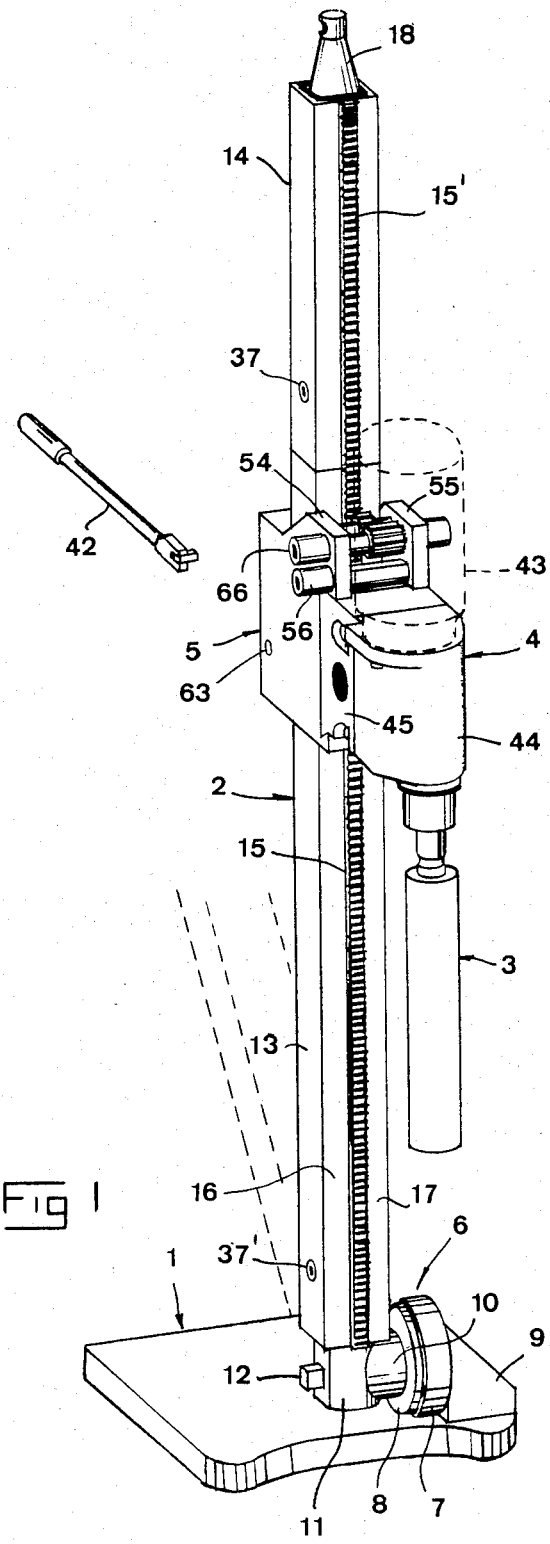
FIG. 1 is a perspective, partly simplified view of the boring assembly according to the invention.

The boring assembly illustrated in FIG. 1 includes a bottom plate 1, a column 2, a boring tool 3, a boring machine member 4, which drives the tool, and a feed member 5, on which the boring machine member 4 is mounted.

The bottom plate 1 may in practice be constructed from aluminium alloy and may, at its lower side, have a conventional endless sealing ring, which confines a space from which the air may be evacuated so as to obtain a vacuum by means of which the plate is adhered to and rigidly anchored relative to the ground, e.g. a floor.

The column 2 is connected to bottom plate 1 through a connection 6 of conical type, which allows rotation of column 2 relative to the bottom plate as indicated by the dashed lines in the figure. More specifically, the connection 6 comprises two halves 7 and 8, the first-mentioned half 7 being rigidly connected to bottom plate 1 through a socket 9 and comprising a conical female recess (not visible) in which a male projection, which in a corresponding manner is conical, on the half 8 is introduced, the half 8 being in turn rigidly connected to a hollow shaft portion 10 projecting sidewardly and attached to the lower portion 11 of the column. A tightening bolt 12 extends through the center of the shaft 10 and is threadedly connected to the female connection half 7. By tightening bolt 12, the conical surfaces of halves 7, 8 are moved into contact while obtaining a frictional connection between the column and bottom plate. By releasing bolt 12, column 2 will be free to pivot into any inclined position relative to the bottom plate and thereafter, the column may be fixed in said position by tightening bolt 12.

The column 2 may, as mentioned, be assembled by several elements, two of which are illustrated in FIG. 1, namely elements 13, 14. These elements are identically designed except that their length differs. Thus, each element is prepared from a rectangular tube having comparatively large wall thickness, e.g. in the order of 3-4 mm. A rack 15 (see element 13) is provided along one wall of the tube, said rack extending all along the element and forming, together with a corresponding rack of the adjacent element (see rack 15' on element 14), a continuous cogway all along the column in its assembled state. More specifically, the cogway 15, 15' is generally centrally arranged along the tube wall so that planar runways 16, 17 are formed on opposite sides of the cogway for rotary members in feed member 5.

Figures 3, 4:
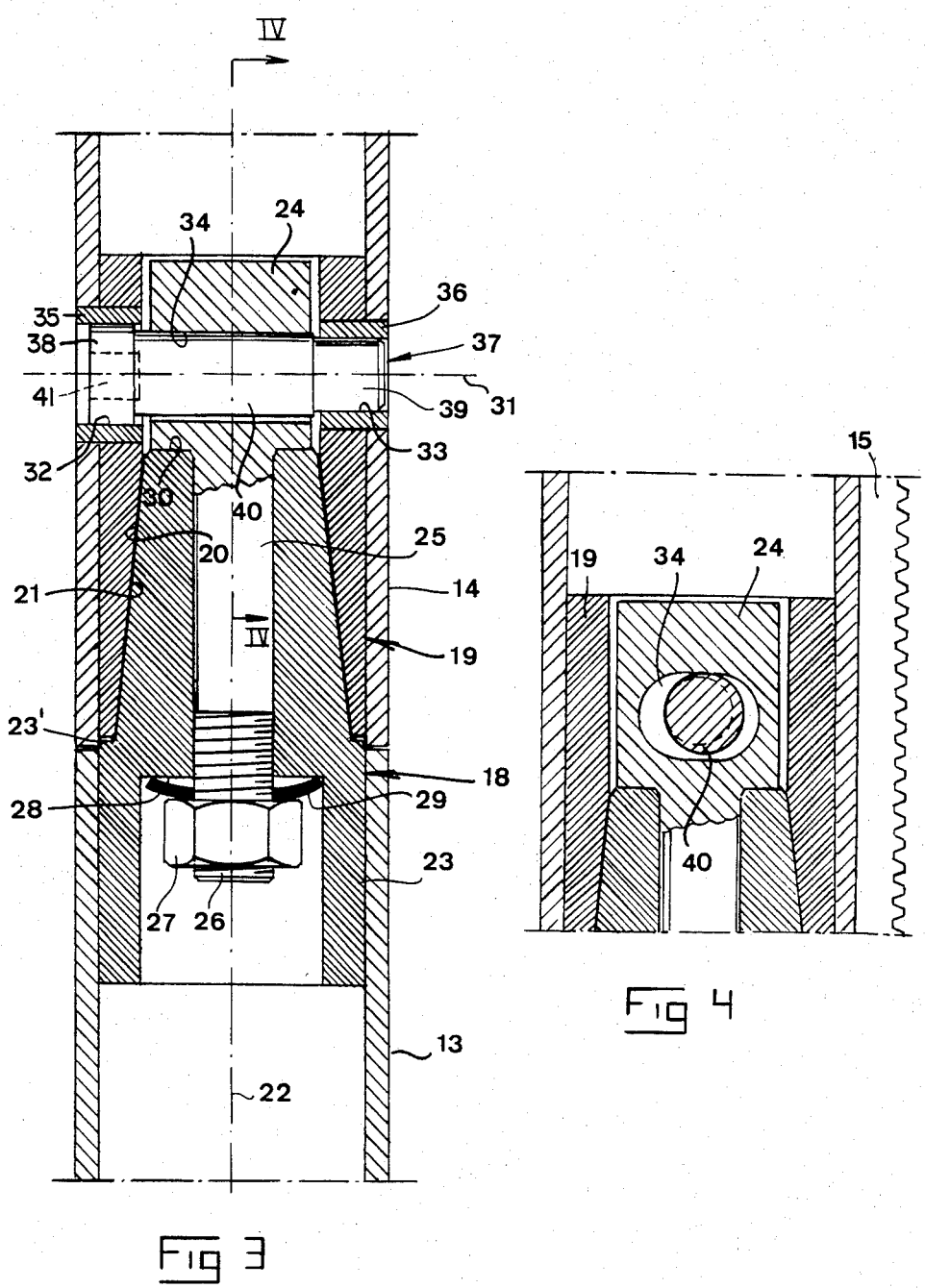
FIG. 3 is a section through a coupling between two members, which together form the column of the boring assembly.
FIG. 4 is a section IV—IV in FIG. 3.

The tube elements 13, 14 are interconnected through a coupling illustrated in detail in FIGS. 3 and 4, said coupling including a female member at the lower end of each column tube element and a male element at the upper end of each tube element.

Reference is now made to FIGS. 3 and 4 illustrating the coupling according to the invention. In the drawing, the male member in the coupling is denoted 18 while the female member is denoted 19. The male member 18 has a wedge surface formed by an external conical surface 20, while the female member 19 has an internal conical surface 21 with generally the same conicity as surface 20. Female member 19 is formed by a tubular body which is welded or otherwise rigidly connected to the lower part of the column element, e.g. the tube 14. The male member 18 comprises two elements movable relative to each other along axis 22, namely a first element 23 comprising the conical surface 20, said element being welded or otherwise anchored to the upper end of the column element 13, and a second element formed by a head, a pull rod 25 having a thread 26 projecting downwardly from the lower side of the head. A nut 27 is engaged with the thread and between the nut and a downwardly directed abutment surface 28 of element 23 there is a strong disc spring 29 urging to maintain the head 24 against an upwardly directed annular abutment surface 30 of element 23.

The female member 19 and movable head 24 of the male member have holes extending along the transverse axis 31. More specifically, the female member 19 has two diametrically opposed holes 32, 33, which are located on opposite sides of the female recess of the member and the first-mentioned of which has a larger diameter than the last-mentioned. In the head 24, there is a hole 34 having an oblong cross section. The holes 32, 33 are in this embodiment defined by bushings 35, 36. An eccentric 37 is introduced into the holes 32, 33, 34, said eccentric having two cylindrical and concentrical end portions 38, 39 located along the axis 31 and having different diameters to fit into corresponding holes in the female member and a cylindrical portion 40 located between the two end portions and having a center axis being eccentric relative to axis 31 common to the end portion.

In the larger end portion 38 of the eccentric, a recess 41, e.g. rectangular, is provided for a suitable operating handle or key.

The coupling described operates in the following way. Prior to assembly of the tube elements 13, 14 provided with the male and female members, the eccentric is separated from other coupling parts. When coupling is to be carried out, the male and female members are provisionally moved together so that the two transverse holes 32, 33 of the female member are generally aligned with transverse hole 34 in the head 24 of the male member. In this position, the eccentric 37 is introduced into the holes so that the forward pinlike end portion 39 is engaged with hole 33. A rather small clearance between end portions 38, 39 and corresponding holes 32, 33 is at hand, while the clearance between intermediate portion 40 and corresponding hole 34 in head 24 may be rather large. The eccentric is now rotated about 90°, e.g. through operating handle 42 illustrated in FIG. 1. This means that the conical surfaces 20, 21 of the male and female members are pressed together into intimate contact with each other at the same time as the spring 29 is tensioned by transmission of power through the head 24, pull rod 25 and nut 27; which in turn means that eccentric 37 is safely maintained in the assumed position of rotation.

The non-conical lower half of the first element 23 of the male member protrudes somewhat above the upper end edge of the tube element 13 and the lower edge of female member 19 is located somewhat above the lower edge of the upper tube element 14. The exterior of element 23 is rectangular with the same cross section as the two tube elements 13, 14, which means that the two tube elements are prevented from rotation relative to each other when the rectangular section 23' of element 23 protrudes into the corresponding rectangular lower part of tube element 14.

The coupling is released in the following manner. The eccentric 37 is rotated at least 180° so that the eccentric intermediate portion 40 will act against the lower planar surface of the hole 34 in head 24, which means that head 24 urges the element 23 of male member 18 downwardly so that the frictional engagement between conical surfaces 20, 21 ceases. Subsequently, the eccentric 37 is removed from the holes and the male and female members may be separated.

It is to be observed that the eccentric may be operated from the side of tube element 14 in that the eccentric and the holes in which it may be introduced extend transversely relative to the length of the tube elements.

With the coupling illustrated in FIGS. 3 and 4 it is possible to erect boring frame columns from several elements in extremely limited time.

Referring to FIG. 1, not only the tube elements 13 and 14 are interconnected through a coupling of the kind described, as indicated by eccentric 37, but also the lower part 11 of the column and the tube element 13 are interconnected by such a coupling as indicated at 37' in FIG. 1.

As appears from FIG. 1, the boring machine part 4 previously described is assembled from several components, namely a motor 43 indicated with dashed lines, a gearbox 44 and a frame portion 45, to which the gearbox is attached. As mentioned, the boring machine part 4 according to the invention is connected to the feed member 5, which is movable along the column, through a quick locking means. The features of this quick locking means appear specifically from FIG. 2, to which reference is made.

Figure 2:
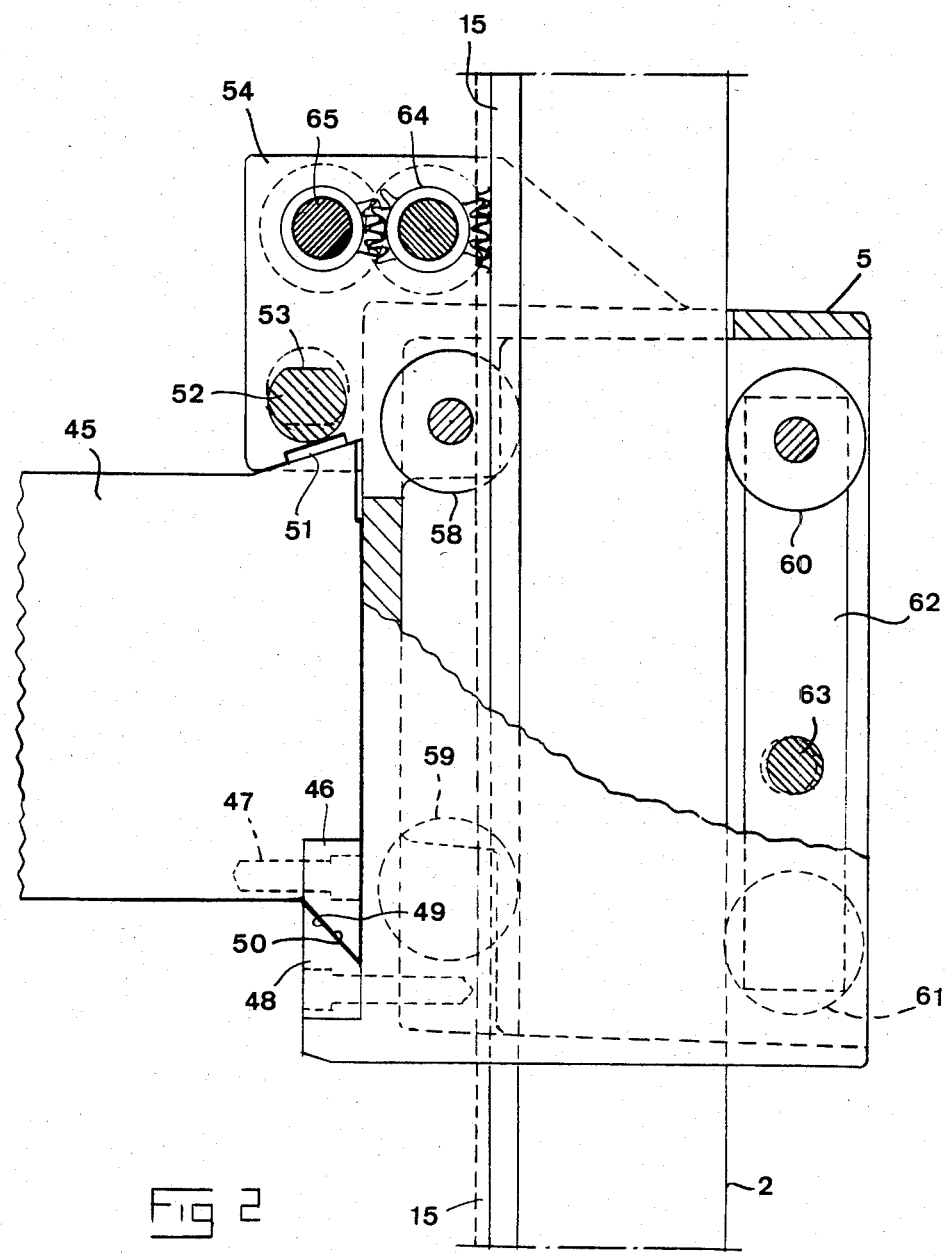
FIG. 2 is an enlarged section through a feed member of the assembly, a column and a boring machine member being illustrated partly cut.

In FIG. 2, the boring machine part or more specifically, the frame portion 45 thereof, is only indicated to the left in the figure. At its end facing feed member 5, the frame portion 45 is at the bottom provided with a rim 46 of wear resistant material. The rim may be attached to frame portion by screws 47 indicated with dashed lines in the figure. Rim 46 co-operates with a similar rim 48 screwed onto feed member 5. This co-operation is achieved via two inclined wedge-like surfaces, namely a first wedge surface 49 on rim 46 extending obliquely outwardly and downwardly from frame member 45 and a second wedge surface 50 on rim 48 extending obliquely upwardly and outwardly from feed member 5.

At the top, frame portion 45 has a part inclined relative to the ground plane, a planar and inclined rim 51 of wear resistant material being provided on said part. This rim 51 co-operates with a tightening means formed by an eccentric 52 on feed member 5. In practice, the eccentric 52 may be formed by a body, which is cylindrical although partly planar at 53 and which at its opposite ends is eccentrically supported in those flanges or walls which pertain to feed member 5 and are denoted 54, 55 in FIG. 1. Body 52 is rotatable by handle 42 via a projection 56 having a recess.

The boring machine part 4 is mounted on feed member 5 in the following manner: The eccentric 52 is rotated into the position indicated with dashed lines in FIG. 2, in which the planar surface 53 is facing downwardly. In this state, frame portion 45 is provisionally hooked onto feed member 5 by engaging the rims 46, 48. Thereafter, the frame portion is pivoted upwardly in a clockwise direction about the pivot center established at rims 46, 48 so that frame portion 45 assumes the position of FIG. 2, in which the front face 57 of the frame portion abuts against a corresponding vertical surface of the feed member. This action may occur without interference from eccentric 52 in that rim 51 freely passes under the downwardly directed planar surface 53. The frame portion is finally tightened by rotating eccentric 52 180° to the position illustrated in full lines in FIG. 2, in which the eccentric actuates the frame portion 45 with a force directed obliquely downwardly. The horizontal component of this force urges the frame portion inwardly towards feed member 5 and the vertical component is, at wedge surfaces 49, 50, divided in such a manner that also there a horizontal force component is obtained which urges the lower part of the frame portion towards feed member 5. Thus, the two wedge surfaces 49, 50 have the dual function to serve as a provisional attachment for the frame portion during mounting and to steadily wedge or press the frame portion against the feed member.

From FIG. 2 it also appears that feed member 5 is guided along column 2 via a number of rotary elements formed by wheels or rollers. More specifically, the feed member has four pairs 58, 59, 60 and 61 of wheels. Each wheel pair includes two wheels separated along the wheel axis. The two first-mentioned pairs of wheels 58, 59 which are arranged on one side of column 2 have the wheels in each pair located on opposite sides of cogway 15, the wheels being adapted to roll along the runways 16, 17 in FIG. 1. These two pairs of wheels 58, 59 are stationarily supported relative to feed member 5, i.e. the wheels are rotatable relative to their axis of rotation but the axis is immovable relative to the side flanges 54, 55 of the feed member.

The two other wheel pairs 60, 61 located on the opposite side of the column are supported on a common carrier formed by a bar 62 which in turn is pivotably supported relative to frame member 5 via axis 63. Thus, the axes of wheel pairs 60, 61 are not directly connected to feed member 5. Since wheel pairs 60, 61 is this way are supported on a common carrier pivotable relative to feed member 5, it is ensured that both wheel pairs always abut the runway on the rear side of the column independently of any tendency of feed member to pivot about wheel pair 58 as a consequence of the torque imparted on the feed member from the counter-force from the boring tool 3 during boring. This means that any tendency to jamming of the feed member is eliminated; which in turn means that the force required from the operator to obtain a certain feed velocity of the boring tool is minimal.

The axis 63, about which carrier 62 is pivotable, may preferably be adjustable and securable relative to the feed member as indicated with the dashed line in FIG. 2. This adjustability may be realized by designing the axis as part of an eccentric. The adjustability enables tightening of the wheel pairs 60, 61 towards wheel pairs 58, 59 so as to ensure contact of all wheel pairs against the runways without play. It is to be observed that the distance between wheel pair 61 and axis 63 is smaller than the distance between wheel pair 60 and the same axis. This means that the force which is exerted on wheel pair 61 via axis 63 as a consequence of the torque acting upwardly on the feed member is greater than the corresponding force on the wheel pair 60 and that axis 63 is comparatively close to the wheel pair 61 which first engages the runway when the feed member is threaded onto column 2. At said threading the wheel pair 61 is free to pivot relative to axis 63 which is not the case when the upper wheel pair contacts the upper edge of the column. In order not to cause undue resistance during threading of the two upper wheel pairs 58, 60 it is, as illustrated in FIG. 2, preferable to have a lever as long as possible between axis 63 and wheel pair 60.

To feed the feed member 5 along the column, a gear arrangement is provided, which comprises two meshing gears 64, 65, the first-mentioned gear engaging the cogway 15 while the latter has a transversal projection 66 (see FIG. 1) to which handle 42 may be connected.

The tube elements to form the column 2 may be at hand in varying lengths so as to enable erection of a column having a length corresponding to varying floor heights in buildings etc.

The invention is of course not limited only to the embodiment described and illustrated. Thus, the coupling described relative to FIGS. 3 and 4 may be used in other connections than in a boring assembly. E.g. the coupling may be used with column-like or tubular components of the kind used in erecting scaffolds or tubular components for obtaining frames, e.g. building frames.

Instead of an eccentric of the kind described, other means, e.g. wedges, which are introduced into and out of transversal holes in the members, may be used in all applications for tightening the male and female members.

The feature described with the aid of FIG. 2, i.e. to arrange the separated wheel pairs 60, 61 on a common pivotable carrier, may be applied not only on feed members for boring assemblies, but on any machine element movable along a longitudinal guide and at the same time subjected to torque. Arbitrary rotary members may be used instead of wheels arranged in pairs, e.g. simple rollers, balls etc. In the embodiment described, two separated first rotary members 58, 59 are shown on one side of the column 2 and two separated second members supported on the common pivotable carrier according to the invention. In the widest application of the invention, the number of first rotary members may be arbitrary, from one upwardly, while the number of second rotary elements may vary from two upwardly. Furthermore, it is possible to arrange the first and second sets of rotary members internally within a guide in the form of a groove having runways facing towards each other, against which the rotary members are pressed outwardly, instead of providing the rotary members on opposite sides of a central guide formed by column 2. Two or more carriers 62, each comprising at least two separated rotary members, may be pivotably connected to a main carrier common to two or more such carriers.

Also other modifications of the invention are conceivable within the scope of the appended claims.

I claim:

1. A coupling for connecting at least two tubular members to each other, a first of said tubular members having a recess and a second of said tubular members having a projection, said recess having an interior conical surface and said projection having an exterior conical surface, tightening means for moving said conical surfaces into wedging contact with each other, said tightening means being operable to cause a generally axial relative movement of said tubular members so as to tend to urge said projection on said second tubular member into said recess of said first tubular member, said projection on said second tubular member including two elements axially movable relative to each other, said elements including a first element including said conical surface of said second member and a second element engageable by said tightening means, spring means acting between said elements and being operable to accumulate spring force upon axial displacement of said second element relative to said first element by said tightening means in order to tighten said coupling, said second element having a portion located at the outer end of said projection so as to form an extension on that part of the first element which has the smallest diameter, an axial hole in said first element, a rod passing through said axial hole and having a threaded end provided with a nut, said portion being attached to said rod, said spring means being located between said nut and a surface on said first element facing away from the outer end of said projection, said first element having an outer end with a shoulder, said spring means acting on said nut so as to urge said second element in a direction towards said shoulder, said recess in said first tubular member having an inner recess portion confined by a wall for receiving said second element, said wall and said second element having transversally extending openings locatable in register with each other upon assembly of said tubular members to receive said tightening means, said tightening means including an eccentric, said rod transmitting, when the coupling is assembled, generally all longitudinally directed forces tending to separate the members from each other.

2. A coupling according to claim 1, wherein a machine element is movable along a column formed by said tubular members and includes first and second rotary members to enable said movement, a number of said first rotary members being associated to a first side of said column and co-operating with at least two of said second rotary members spaced in a direction along said column, a common carrier supporting said second rotary members, said common carrier being pivotably supported relative to said machine element between said second rotary member about an axis to ensure contact of all of said second rotary members against a second side of the column, the distances between said two second rotary members and said axis being different.

3. A coupling according to claim 2, wherein the smallest of the distances between said two second rotary elements and the pivot axis of the carrier is between said axis and that one of said second rotary members which is adapted for initial engagement with the column from one end thereof.

4. A coupling according to claim 1, wherein a boring machine member is mounted on a feed member movable along a column formed by said tubular members to obtain a feed movement of said boring machine member and a boring tool associated thereto, said feed member and said boring machine member being separable into two separate units and being interconnected by quick-locking means.

5. A coupling according to claim 4, wherein said quick locking means includes at least two co-operating wedge surfaces urged into engagement with each other by second tightening means including a first wedge surface which is associated to said boring machine member and extends obliquely outwardly and downwardly from said boring machine member, and a second wedge surface associated with said feed member, said second wedge surface extending obliquely outwardly and upwardly from said feed member.

6. A coupling according to claim 5, wherein said second tightening means is operable to affect said boring machine member in such a way that a first component of a tightening force urges said boring machine member inwardly towards said feed member while a second component of a tightening force urges said first and second wedge surfaces into engagement with each other.

* * * * *